UNITED STATES PATENT OFFICE.

LEVI S. FALES, OF NEW YORK, N. Y.

IMPROVED FERTILIZER.

Specification forming part of Letters Patent No. 88,466, dated March 30, 1869.

*To all whom it may concern:*

Be it known that I, LEVI S. FALES, of the city, county, and State of New York, have invented a new and Improved Artificial Fertilizer; and I do hereby declare that the following is a full, clear, and exact description of the same.

The object of my invention is to provide a concentrated fertilizing material, especially designed to stimulate the rapid growth of plants, and containing an abundance of those organic and inorganic substances which have been shown by experience and chemical research to be the most conducive to the development of vegetation, and this, too, without increasing the cost of the manure as compared with that of other products of similar but inferior character.

To enable others to understand the nature of my invention, I will proceed to describe it.

In order to make, say, one ton of my improved fertilizer, I place about one hundred and forty pounds of ordinary commercial sulphate of ammonia in a boiler or receiver connected by a suitable pipe with a vessel, which should be lined with lead. To the sulphate of ammonia I then add about ten barrels of the refuse ammoniacal liquors from gas-works, if such be available; but in default of this liquor water may be used as a substitute. To this I add of common slaked lime a quantity equal in weight to the sulphate of ammonia, the object of thus adding the lime being to displace the ammonia from its combinations in the liquid when the latter is heated, as hereinafter explained. I then place in the vessel above mentioned the following materials, in the proportions named: of bones, either dry or green, as the case may be, from four hundred to five hundred pounds; of old leather scraps or equivalent nitrogenous material, say, eight hundred pounds; of blood, as commonly taken from the slaughter-houses in bulk, from three to four barrels; of water, one hundred gallons, and of sulphuric acid a quantity equal to one-third of the aggregate weight of the bones and blood. The sulphuric acid, for the sake of economy, may be that known as "waste acid" from oil-refineries.

The materials being thus placed in the still or apparatus, heat is applied to the boiler or receiver, and mingled steam and ammoniacal vapors pass over into the vessel containing the blood, bones, leather scraps, &c. The sulphuric acid acting upon the other materials contained in the vessel reduces them to a pulverulent condition, and the ammonia of the vapors just mentioned unites with and becomes fixed by any free acid that may exist in the mass, so that by this means the fertilizing constituents of the several ingredient materials are reduced to such condition as to be readily assimilated by plants when applied to the soil at the same time that the volatile portions are arrested and prevented from being dissipated in the atmosphere.

When the process just described is complete the fertilizing substance or material thus produced will be found to have settled to the bottom of the vessel in the form of a more or less disintegrated and powdered mass. This is removed from the vessel by any suitable means and placed upon inclined platforms so arranged that the liquids may readily drain therefrom, it being preferred that the platform be so situated that the liquid may run back into the vessel.

After being suffered to drain in this manner for, say, twenty-four hours, from three hundred to four hundred pounds of dry peat, or, in the place of this, of so-called "Jersey marl," are added to the mass for the purpose of absorbing any moisture that may remain in it. This brings the whole to the dry pulverulent condition, in which it is fit for barreling previous to transportation, &c.

The liquid left in the vessel after the removal of the material therefrom, as just described, may, if desired, be used in the place of water in charging the vessel in the preparation of the succeeding batch or quantity of the fertilizer.

What I claim as my invention, and desire to secure by Letters Patent, is—

The artificial fertilizer composed of the materials herein set forth, compounded in the manner and proportions substantially as specified.

LEVI S. FALES.

Witnesses:
J. W. COOMBS,
A. KINNIER.